US011326913B2

(12) United States Patent
Hocker (10) Patent No.: US 11,326,913 B2
(45) Date of Patent: May 10, 2022

(54) TRANSDUCER APPARATUS AS WELL AS MEASURING SYSTEM FORMED BY MEANS OF SUCH A TRANSDUCER APPARATUS (71) Applicant: Endress + Hauser Flowtec AG, Reinach (CH)

(72) Inventor: Rainer Hocker, Walddshut (DE)

(73) Assignee: ENDRESS + HAUSER FLOWTEC AG, Reinach (CH)

(*) Notice: Subject to any disclaimer, the term of this patent is extended or adjusted under 35 U.S.C. 154(b) by 886 days.

(21) Appl. No.: 16/063,785

(22) PCT Filed: Nov. 16, 2016

(86) PCT No.: PCT/EP2016/077809
§ 371 (c)(1),
(2) Date: Jun. 19, 2018

(87) PCT Pub. No.: WO2017/108278
PCT Pub. Date: Jun. 29, 2017

(65) Prior Publication Data
US 2020/0271489 A1 Aug. 27, 2020

(30) Foreign Application Priority Data
Dec. 22, 2015 (DE) .................... 10 2015 122 553.0

(51) Int. Cl.
G01F 1/32 (2022.01)
G01L 9/00 (2006.01)

(52) U.S. Cl.
CPC .......... *G01F 1/3254* (2013.01); *G01F 1/3263* (2013.01); *G01L 9/0016* (2013.01); *G01L 9/0025* (2013.01)

(58) Field of Classification Search
CPC ...... G01F 1/3254; G01F 1/3263; G01F 1/329; G01F 1/3209; G01L 9/0025; G01L 9/0016
See application file for complete search history.

(56) References Cited

U.S. PATENT DOCUMENTS 4,361,050 A    11/1982 Coussot et al.
4,586,382 A *  5/1986 Sinha .................... G01L 9/0025
                                                310/313 B
(Continued)

FOREIGN PATENT DOCUMENTS

CN    101644772 A    2/2010
CN    101690252 A    3/2010
(Continued)

OTHER PUBLICATIONS

Office Action dated Aug. 23, 2019 in corresponding Chinese Application No. 201680075801.1.
(Continued)

*Primary Examiner* — Paul M. West
(74) *Attorney, Agent, or Firm* — Bacon & Thomas, PLLC (57) ABSTRACT A transducer apparatus comprises a deformation body as well as, positioned on the deformation body and connected therewith by material bonding, a radio sensor having a surface facing away from the deformation body. The radio sensor is adapted to receive free-space electromagnetic waves and to convert them into acoustic surface waves propagating along the surface facing away from the deformation body, or to convert acoustic surface waves propagating along the surface into free-space electromagnetic waves. Additionally, the deformation body is adapted as a function of a mechanical force acting thereon, and/or as a function of a temperature change, to be at least partially deformed, in such a manner that at least the surface of the radio sensor facing away from the deformation body expe- (Continued)

riences a shape change influencing a propagation of acoustic surface waves propagating along the surface. A measuring system formed by means of such a transducer apparatus comprises additionally a measuring electronics electrically coupled with the transducer apparatus and adapted to generate at least one electrical driver signal feeding and/or activating the transducer apparatus and to couple such into the transducer apparatus, and to receive and to evaluate a measurement signal delivered from the transducer apparatus.

26 Claims, 6 Drawing Sheets

(56) References Cited

U.S. PATENT DOCUMENTS

| | | |
|---|---|---|
| 5,705,754 A | 1/1998 | Keita et al. |
| 6,003,384 A | 12/1999 | Frohlich et al. |
| 6,101,885 A | 8/2000 | Touzin et al. |
| 6,223,605 B1 | 5/2001 | Koudal et al. |
| 6,352,000 B1 | 3/2002 | Getman et al. |
| 6,910,387 B2 | 6/2005 | Koudal et al. |
| 6,938,496 B2 | 9/2005 | Koudal et al. |
| 2002/0184940 A1 | 12/2002 | Storm, Jr. et al. |
| 2005/0044966 A1 | 3/2005 | Gysling et al. |
| 2005/0125170 A1 | 6/2005 | Gysling et al. |
| 2005/0155437 A1 | 7/2005 | Bitto et al. |
| 2006/0075820 A1* | 4/2006 | Cobianu ............ G01L 9/0025 73/703 |
| 2006/0081069 A1 | 4/2006 | Bitto et al. |
| 2006/0169058 A1 | 8/2006 | Gysling |
| 2006/0230841 A1 | 10/2006 | Shrikrishna |
| 2006/0254363 A1 | 11/2006 | Hegner et al. |
| 2006/0266127 A1 | 11/2006 | Gysling et al. |
| 2007/0000334 A1 | 1/2007 | Bitto et al. |
| 2008/0072686 A1 | 3/2008 | Hoecker |
| 2008/0186205 A1* | 8/2008 | Breed ............... G08G 1/096758 340/901 |
| 2011/0032922 A1 | 2/2011 | Mirzaei et al. |
| 2011/0154913 A1 | 6/2011 | Konyukhov et al. |
| 2011/0247430 A1 | 10/2011 | Hertel et al. |
| 2012/0073384 A1 | 3/2012 | Rieder |
| 2014/0060154 A1 | 3/2014 | Dijk et al. |
| 2015/0268082 A1 | 9/2015 | Kirst et al. |

FOREIGN PATENT DOCUMENTS

| | | | |
|---|---|---|---|
| CN | 102171539 A | 8/2011 | |
| DE | 42 00 076 A1 | 8/1993 | |
| DE | 198 56 951 A1 | 10/1999 | |
| DE | 19856951 A1 * | 10/1999 | ........... G01L 9/0025 |
| DE | 602 12 037 T2 | 10/2006 | |
| DE | 10 2007 021 172 A1 | 11/2008 | |
| DE | 10 2013 010 015 A1 | 12/2014 | |
| DE | 10 2015 122 553 A1 | 6/2017 | |
| EP | 1 752 916 A1 | 2/2007 | |
| WO | 2005/046426 A2 | 5/2005 | |
| WO | 2014/102036 A1 | 7/2014 | |
| WO | 2014/102037 A1 | 7/2014 | |
| WO | 2014/198494 A1 | 12/2014 | |
| WO | 2014/198495 A1 | 12/2014 | |
| WO | 2015/135738 A1 | 9/2015 | |

OTHER PUBLICATIONS

German Search Report, German PTO, Munich, dated Sep. 29, 2016.
International Search Report, EPO, The Netherlands, dated Feb. 28, 2017.

* cited by examiner

TRANSDUCER APPARATUS AS WELL AS MEASURING SYSTEM FORMED BY MEANS OF SUCH A TRANSDUCER APPARATUS

TECHNICAL FIELD

The invention relates to a transducer apparatus, especially for registering pressure fluctuations in a Kármán-type vortex street formed in a flowing fluid, and to a measuring system formed by means of such a transducer apparatus.

BACKGROUND DISCUSSION

In process measurements- and automation technology, transducer apparatuses with a deformation body and a sensor element mounted thereto, or located thereon, are often used for measuring physical, measured variables of fluid measured substances, variables such as e.g. pressure and/or flow velocity of a fluid measured substance flowing in a pipe or tube. These transducer apparatuses convert the measured variable into an electronically evaluatable measurement signal. The deformation body is adapted to be deformed, at least partially, equally as well reversibly, as a function of a mechanical force acting thereon and/or as a function of a temperature change, in such a manner that also the sensor element experiences a shape change influencing at least one electrical variable of the sensor element, for example, an ohmic resistance, a capacitance or an inductance, or an impedance, and wherein the deformation body is adapted to be contacted by the measured substance on a side facing away from the sensor element, in such a manner that the shape change of the surface of the sensor element is effected at least partially by a force exerted by the fluid measured substance on the deformation body and/or by a temperature difference between the deformation body, or sensor element, and measured substance. Additionally, the deformation body can also be actively excited to execute mechanical oscillations about a static resting position, for example, mechanical oscillations in the form of resonant oscillations dependent on a density, or viscosity, of the measured substance. Examples of such transducer apparatuses, or measuring systems formed therewith,—long established in industrial measuring and automation technology include, among others, vortex flow-measuring devices serving for measuring a volume flow rate, or a flow velocity, vibronic mass flow and/or density-measuring devices serving for measuring a mass flow rate, or a density, however, also pressure, or temperature-measuring devices serving for measuring a pressure and/or a temperature or even sonar based flow-monitoring systems, especially those serving for evaluating sound induced by the measured substance and/or for analyzing multiphase measured substances (dispersions), i.e. devices such as known from, among others, US-A 2005/0044966, US-2005/0125170, US-A 2005/0155437, US-A 2006/0081069, US-A 2006/0169058, US-A 2006/0230841, US-A 2006/0254363, US-A 2006/0266127, US-A 2007/0000334, US-A 2008/0072686, US-A 2009/030121, US-A 2011/0154913, US-A 2011/0247430, US-A 2012/0073384, US-A 2014/0060154, US-A 2015/0268082, U.S. Pat. Nos. 5,705,754, 6,003,384, 6,101,885, 6,223,605, 6,352,000, 6,910,387, 6,938,496, and published International Application WO-A 2014/102036, WO-A 2014/102037, WO-A 2014/198494, WO-A 2014/198495 or WO-A 2015/135738, or such as offered, among others, also by the applicant under the designations "Prowirl D 200", "Prowirl F 200", "Prowirl O 200", "Prowirl R 200", "Promass 84F", "Promass 80S", "Promass 83X", "Cerabar PMC71", or "Cerabar PMP51".

The deformation body can, accordingly, be, for example, disc shaped or even tubular, consequently be formed by means of a circular membrane and/or by means of a tube as well as additionally be adapted to be bent and/or strained from a static resting position, for example, due to a variable force and/or due to actively excited, or forced, mechanical oscillations. Examples of material for the deformation body regularly include ceramic or metal, for example, stainless steel, titanium, tantalum or nickel based alloys. The above-referenced sensor element can, in turn, be formed, for example, by means of a strain gauge, an induction coil or a capacitor registering relative movements, or by means of a component of a measurement bridge circuit.

Particularly due to the proximity of the sensor element to the measured substance, or the most often high thermal conductivity of the deformation body, on the one hand, as well as the limited temperature resistance, or -stability of the materials regularly utilized for the sensor element, or its connection with the deformation body, on the other hand, use of transducer apparatuses of the type being discussed is most often reserved for measuring points, where a maximum measured substance-temperature of, at most, 400° C. is specified. Equally there is continuously also a need to use such proven transducer apparatuses—not least of all also proven as regards the therewith implemented, also versatilely applicable, transducer- , or measuring principles, as well as also for reasons of the therewith regularly achievable, high measurement accuracies—also in such measuring points, wherein measured substance-temperatures of greater than 400° C. are expected, for example, for measuring measured variables of a petroleum being converted ("cracked"), consequently petroleum having a temperature of above 450° C., and/or for measuring measured variables of a highly heated, liquid heat carrier, such as e.g. a thermal oil or a salt melt, for example, one used in the case of the aforementioned conversion.

SUMMARY OF THE INVENTION

Starting from the aforementioned state of the art, an object of the invention is to improve the construction of transducer apparatuses having a deformation body serving for transducing forces and/or temperatures such that they can also be exposed to measured substance temperatures of greater than 400° C., or that therewith also measured variables of measured substances having temperatures greater than 400° C. can be registered.

For achieving the object, the invention resides in a transducer apparatus, especially one for registering pressure fluctuations in a Kármán type vortex street formed in a flowing fluid. The transducer apparatus comprises: a deformation body, especially a deformation body at least sectionally membrane like and/or at least sectionally disk shaped and/or at least sectionally tubular and/or metal; as well as, positioned on the deformation body and connected therewith by material bonding, for example, by adhesive, a radio sensor having a surface facing away from the deformation body;

wherein the radio sensor is adapted to receive free-space electromagnetic waves and to convert them into acoustic surface waves propagating along the surface facing away from the deformation body;

wherein the radio sensor is adapted to convert acoustic surface waves propagating along the surface into free-space electromagnetic waves; and wherein the deformation body is adapted as a function of a mechanical force acting thereon, especially a mechanical force changeable as a function of time and/or introduced via a side of the deformation body facing away from the radio sensor, and/or as a function of a temperature change, to be at least partially deformed, especially bent and/or strained from a static resting position (zero position), in such a manner that at least the surface of the radio sensor facing away from the deformation body experiences a shape change influencing a propagation of acoustic surface waves propagating along the surface, especially a shape change changing as a function of time and/or reversibly, for example, a shape change influencing a propagation path and/or a travel time of acoustic surface waves propagating along the surface.

Moreover, the invention also resides in a measuring system, comprising: such a transducer apparatus; as well as a measuring electronics electrically coupled with the transducer apparatus, especially with an antenna of the transducer apparatus, and/or with a waveguide of the transducer apparatus; wherein the measuring electronics is adapted to generate at least one electrical driver signal feeding and/or activating the transducer apparatus and to couple such into the transducer apparatus, especially into an antenna of the transducer apparatus, or a waveguide of the transducer apparatus, and wherein the measuring electronics is adapted to receive and to evaluate a measurement signal delivered from the transducer apparatus, especially from an antenna of the transducer apparatus, or a waveguide of the transducer apparatus, especially to ascertain by means of the measurement signal a measured value quantifying a size of an instantaneous shape change of the radio sensor and/or a measured value quantifying a frequency of a periodic shape change of the radio sensor.

Furthermore, the invention also resides in using such a transducer apparatus, or such a measuring system, for registering at least one physical measured variable of a fluid measured substance, for example, a fluid measured substance flowing at least at times and/or having at least at times a measured substance-temperature of greater than 400° C., for example, for registering a temperature of a fluid measured substance and/or for registering a density of a fluid measured substance and/or for registering a pressure in a fluid measured substance and/or for registering a flow velocity of a fluid measured substance guided in a pipe or tube and/or for registering pressure fluctuations in a Kármán vortex street formed in a flowing, fluid measured substance, and for producing the measured values, especially digital, measured values, representing the measured variable.

In a first embodiment of the transducer apparatus of the invention, it is, furthermore, provided that the radio sensor is adapted to convert received free-space electromagnetic waves into time delayed, free-space, electromagnetic waves, especially electromagnetic waves delayed by least 1 µs (microsecond) relative to the received free-space electromagnetic waves.

In a second embodiment of the transducer apparatus of the invention, it is, furthermore, provided that the radio sensor is adapted to reflect acoustic surface waves propagating along the surface, especially in such a manner that acoustic surface waves emitted from a transmitting- and receiving zone are converted into acoustic surface waves striking time delayed on the transmitting- and receiving zone, especially acoustic surface waves delayed by least 1 µs (microsecond) relative to the emitted acoustic surface waves.

In a third embodiment of the transducer apparatus of the invention, it is, furthermore, provided that the deformation body is adapted to react to a mechanical force acting thereon and changeable as a function of time—especially acting at least at times having a periodically changing magnitude and/or at least at times a periodically changing direction—with elastic deformations changing as a function of time, especially with elastic deformations, which bring about shape changes of the surface of the radio sensor changing as a function of time.

In a fourth embodiment of the transducer apparatus of the invention, it is, furthermore, provided that the deformation body is adapted to react to a mechanical force changeable as a function of time and acting thereon—especially a mechanical force at least at times having a periodically changing magnitude and/or at least at times a periodically changing direction—, especially a mechanical force effected by a fluid measured substance contacting the deformation body, with mechanical oscillations about a static resting position, especially with mechanical oscillations about a static resting position, which bring about shape changes of the surface of the radio sensor changing as a function of time.

In a fifth embodiment of the transducer apparatus of the invention, it is, furthermore, provided that the deformation body is adapted to be caused to vibrate for effecting the shape changes of the surface of the radio sensor changing as a function of time.

In a sixth embodiment of the transducer apparatus of the invention, it is, furthermore, provided that the deformation body is mechanically prestressed, especially elastically strained, in a static resting position.

In a seventh embodiment of the transducer apparatus of the invention, it is, furthermore, provided that the deformation body is adapted to be contacted on a side facing away from the radio sensor by a fluid measured substance, especially a fluid measured substance flowing at least at times, especially in such a manner that the shape change of the surface of the radio sensor is effected at least partially by a force exerted by the fluid measured substance on the deformation body and/or by heat transferred between measured substance and deformation body.

In an eighth embodiment of the transducer apparatus of the invention, it is, furthermore, provided that the deformation body is composed at least partially of a metal, for example, a stainless steel, titanium, tantalum or a nickel based alloy.

In a ninth embodiment of the transducer apparatus of the invention, it is, furthermore, provided that the deformation body is composed at least partially of a ceramic.

In a tenth embodiment of the transducer apparatus of the invention, it is, furthermore, provided that the deformation body is disc shaped.

In an eleventh embodiment of the transducer apparatus of the invention, it is, furthermore, provided that the deformation body has a membrane, for example, circular disk shaped membrane, or is formed by means of a membrane, for example, a circular disk shaped membrane. Developing this embodiment of the invention further, it is, additionally, provided that the radio sensor is positioned on a side of the membrane and connected with such by material bonding, for example, by adhesive.

In a twelfth embodiment of the transducer apparatus of the invention, it is, furthermore, provided that the deformation body has a membrane, for example, a circular disk shaped membrane, or is formed by means of a membrane, for example, a circular disk shaped membrane, and that the deformation body has a sensor blade, for example, a paddle-shaped sensor blade and/or an at least sectionally wedge shaped sensor blade and/or an at least sectionally rod-shaped sensor blade, or is formed by means of a sensor blade, for example, a paddle shaped sensor blade and/or an at least sectionally wedge shaped sensor blade and/or an at least sectionally rod-shaped sensor blade. The radio sensor can be positioned on a side of the membrane and connected with such by material bonding, for example, by adhesive, while the sensor blade can be positioned on a side of the membrane facing away from the radio sensor. Developing this embodiment of the invention further, it is, additionally, provided that the sensor blade is adapted to convert a force acting thereon into a deformation of the membrane effecting the shape change of the surface of the radio sensor and/or to be inserted into a lumen of a tube, and/or to be flowed around by a fluid measured substance flowing in a lumen of a tube. Especially, the sensor blade can be adapted to convert a force acting thereon and effected by a fluid measured substance, for example, by pressure fluctuations within the measured substance, into a deformation of the membrane effecting the shape change of the surface of the radio sensor.

In a thirteenth embodiment of the transducer apparatus of the invention, it is, furthermore, provided that the deformation body is tubular.

In a fourteenth embodiment of the transducer apparatus of the invention, it is, furthermore, provided that the deformation body has a tube, especially an at least sectionally bent and/or an at least sectionally straight tube, or is formed by means of a tube, especially an at least sectionally bent and/or at least sectionally straight tube.

In a fifteenth embodiment of the transducer apparatus of the invention, it is, furthermore, provided that the deformation body, especially a tubular deformation body, or a deformation body formed by means of a tube, has a lumen surrounded by a wall, especially a metal wall, and the lumen is adapted to guide a fluid measured substance, especially a fluid measured substance flowing at least at times. Developing this embodiment of the invention further, it is, additionally, provided that the radio sensor is positioned on a side of the wall facing away from the lumen and/or that the radio sensor is connected with the wall.

In a sixteenth embodiment of the transducer apparatus of the invention, it is, furthermore, provided that the radio sensor has at least one interdigital transducer, for example, an interdigital transducer electrically connected with at least one antenna.

In a seventeenth embodiment of the transducer apparatus of the invention, it is, furthermore, provided that the radio sensor has at least one antenna, especially an antenna electrically connected with at least one interdigital transducer, for converting therewith received, free-space electromagnetic waves into a line conducted, electrical, alternating voltage and/or for converting an applied, electrical, alternating voltage into free-space electromagnetic waves emitted by the radio sensor.

In a first further development of the invention, the transducer apparatus further comprises: an actuator, especially an actuator positioned on the deformation body and/or connected therewith by material bonding, which actuator is adapted to deform the deformation body elastically, for example, in such a manner that the deformation body at least at times executes mechanical oscillations about a static resting position and/or in such a manner that the deformation body at least at times is deflected from a static resting position.

In a second further development of the invention, the transducer apparatus further comprises: at least one additional (second) radio sensor. In an additional embodiment of this further development of the invention, it is, additionally, provided that each of the at least two radio sensors has, in each case, a predetermined bandwidth and a predetermined center frequency, especially a center frequency, which deviates from the center frequency of the other radio sensor by more than a sum of the bandwidths of the two radio sensors.

In a third further development of the invention, the transducer apparatus further comprises: at least one transmitting- and receiving system positioned with a separation, for example, a fixed separation, from the radio sensor, for example, a transmitting- and receiving system having an antenna and/or a waveguide and which is adapted and applied to transform electrical, alternating voltage into free-space electromagnetic waves propagating toward the radio sensor, and which is adapted to receive free-space electromagnetic waves emitted by the radio sensor and to transform them into a line conducted, electrical, alternating voltage.

In an embodiment of this further development of the invention, it is, additionally, provided that the transmitting- and receiving system has a waveguide positioned with a separation, especially a fixed separation, from the radio sensor, especially a waveguide formed by means of a metal tube and/or as a hollow conductor, which waveguide is adapted to guide electromagnetic traveling waves and at an end facing the radio sensor to transform them into free-space electromagnetic waves propagating in the direction of the radio sensor, and which waveguide is adapted to receive via the end free-space electromagnetic waves emitted by the radio sensor and to transform them into electromagnetic traveling waves propagating in the waveguide.

In a fourth further development of the invention, the transducer apparatus further comprises: at least one transmitting- and receiving system positioned with a separation, for example, a fixed separation, from the radio sensor, for example, a transmitting- and receiving system having an antenna and/or a waveguide; as well as a holder system mechanically connected both with the deformation body as well as also with the transmitting- and receiving system, for example, a holder system formed by means of a connecting nozzle, for fixing a position of the transmitting- and receiving system relative to the deformation body, or the therewith connected radio sensor, located in the static resting position, wherein the transmitting- and receiving system is adapted and applied to transform electrical, alternating voltage into free-space electromagnetic waves propagating toward the radio sensor, and wherein the transmitting- and receiving system is adapted to receive free-space electromagnetic waves emitted by the radio sensor and to transform them into a line conducted, electrical, alternating voltage.

In a first embodiment of the measuring system of the invention, it is, furthermore, provided that the transducer apparatus is positioned in a connecting nozzle of a process container, for example, a pipeline or a tank, especially in such a manner that the deformation body protrudes at least partially inwardly into a lumen of the process container, or that the deformation body can be contacted by a measured substance guided in the process container.

In a second embodiment of the measuring system of the invention, it is, furthermore, provided that the measuring electronics is adapted, for registering at least one physical measured variable of a fluid measured substance flowing at least at times—, for example, for registering a temperature of a fluid measured substance and/or for registering a density of a fluid measured substance and/or for registering a pressure in a fluid measured substance and/or for registering a flow velocity of a fluid measured substance guided in a pipe or tube and/or for registering pressure fluctuations in a Kármán type vortex street formed in a flowing fluid measured substance—in order to ascertain, based on travel time information contained in the measurement signal, a measured value quantifying a frequency of a periodic shape change of the radio sensor and/or to ascertain, based on an amplitude spectrum contained in the measurement signal, a measured value quantifying a size of an instantaneous shape change of the radio sensor.

The invention as well as advantageous embodiments thereof will now be explained in greater detail based on examples of embodiments shown in the figures of the drawing. Same or equally acting or equally functioning parts are provided in all figures with equal reference characters; when perspicuity requires or it otherwise appears sensible, already mentioned reference characters are omitted in subsequent figures. Other advantageous embodiments or further developments, especially also combinations of, firstly, only individually explained aspects of the invention, will become evident, furthermore, from the figures of the drawing and/or from claims per se.

Figure 1:
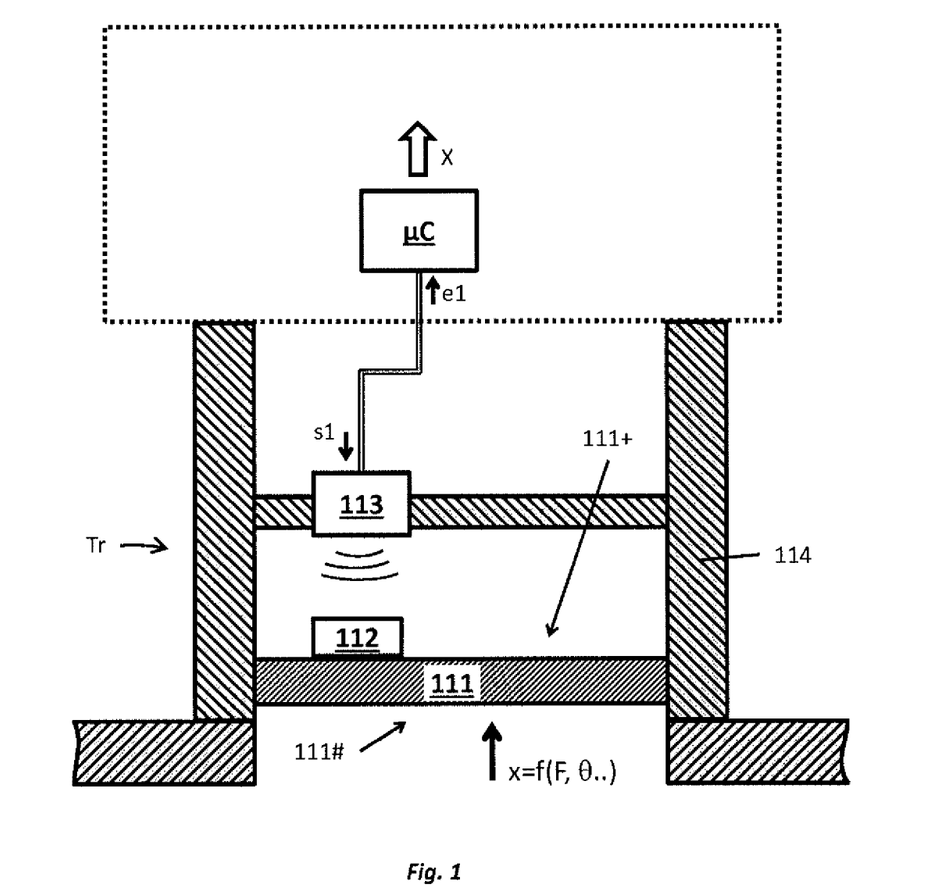
FIGS. 1, 2 schematically in section, in each case, a measuring system with a transducer apparatus for measuring a fluid measured substance.
Figure 2:
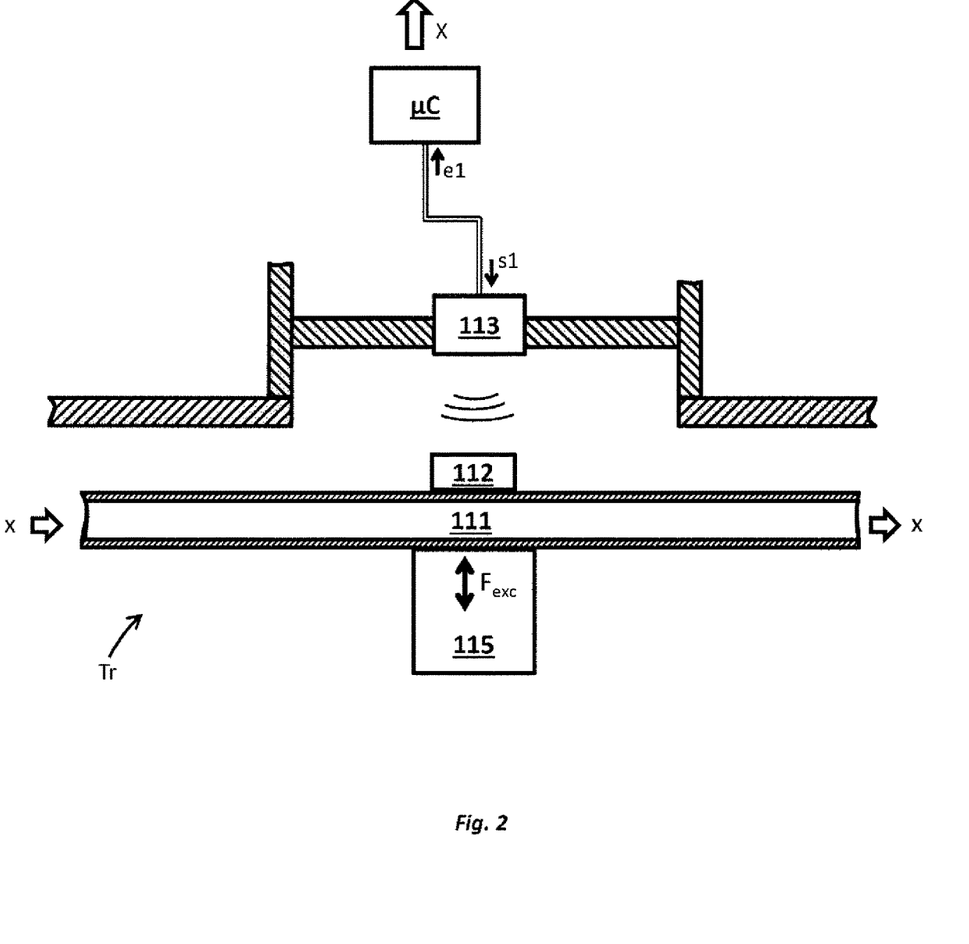

Shown schematically in FIGS. 1 and 2 is, in each case, a measuring system formed by means of a transducer apparatus Tr having a deformation body 111, especially a monolithic deformation body, and a radio sensor 112 connected by material bonding therewith. In addition to the aforementioned transducer apparatus Tr, the measuring system comprises, as well as also shown in FIG. 1, or 2, furthermore, a measuring electronics μC electrically coupled with the transducer apparatus Tr and formed, for example, by means of a microprocessor and/or a digital signal processor (DSP). The measuring electronics μC is adapted both to generate, and to couple into the transducer apparatus Tr, at least one electrical driver signal s1 feeding and/or activating the transducer apparatus Tr, as well as also to receive and to evaluate a measurement signal e1 delivered from the transducer apparatus.

The transducer apparatus Tr, and the measuring system formed therewith, are, especially, provided and adapted to register, and to measure, at least one physical measured variable x, especially a physical measured variable changeable as a function of time, for a fluid measured substance, for example, also a fluid measured substance flowing at least at times and/or at least at times having a measured substance-temperature θ greater than 400° C., for example, to generate at least one measured value X, especially a digital measured value, representing the measured variable x, or continuously to ascertain and to output such measured values X. The measured values X can, for example, be displayed on-site by means of a display system provided in the measuring electronics μC and/or transmitted—by wire via fieldbus connected, in given cases, and/or wirelessly per radio—to an electronic data processing system, for instance, a programmable logic controller (PLC) and/or a process control station, The transducer apparatus Tr can, furthermore, be adapted to be positioned in a connecting nozzle of a process container, for example, a tank or a pipeline, or, such as also schematiccally indicated in FIG. 1, in a connecting nozzle of a process container, for example, in such a manner that the deformation body protrudes at least partially inwardly into a lumen of the process container, or that the deformation body can be contacted, or is contacted, by a measured substance guided in the process container.

The above-referenced process container can be embodied, for example, as a plant component of a heat supply network or a turbine circulatory system. Consequently, the measured substance can be, for example, steam, especially also saturated steam or superheated steam, or, for example, also a condensate drained from a steam line. The measured substance can, however, for example, also be a thermal oil or, for example, a salt melt. Examples of materials for deformation body 111 include, especially, metals, for example, a stainless steel, titanium, tantalum or a nickel based alloy, or a high strength industrial ceramics, for example, metal-oxide ceramics, such as, for instance, aluminum oxide ceramics ($Al_2O_3$) or zirconium oxide ceramics ($ZrO_2$). The material bonded connection of deformation body 111 and radio sensor 112 can be e.g. a soldered or brazed connection or, for example, an adhesive connection formed by an adhesive.

The measured variable to be registered by means of the transducer apparatus Tr can, in turn, be e.g. a pressure p, a temperature θ, a viscosity and/or a density ρ of a fluid measured substance or, for example, also a flow velocity u of a fluid measured substance guided in a pipeline, or, as a function of a flow velocity, pressure fluctuations p(t), for example, also pressure fluctuations that are at least at times periodic, in a Kármán vortex street formed in the flowing, fluid measured substance. Accordingly, the measuring system can also be embodied as a pressure- or temperature measuring device, or, for example, also as a vortex flow measuring device, a vibronic, density- and/or viscosity measuring device or a sonar based, flow-monitoring device, or a flow-monitoring device evaluating sound induced by the measured substance, or be formed by means of such a measuring- , or monitoring device.

Accordingly, the deformation body 111 can be embodied, as well as also shown in FIG. 1, for example, at least sectionally membrane like, or disk shaped. Alternatively, the deformation body can, however, also be embodied, for example, tubularly, for example, also in such a manner that the deformation body 111 has, as shown in FIG. 2, a lumen enveloped by a wall and adapted, in given cases, to guide the above-referenced measured substance flowing at least at times. Therefore, the deformation body 111 has, according to an additional embodiment of the invention, a membrane 111*a*, for example, also a circular, disk shaped membrane, or the deformation body 111 is formed by means of such a membrane 111*a*. In another embodiment of the invention, the deformation body 111 comprises a pipe, or the deformation body 111 is formed by means of a tube. The tube can be, for example, at least sectionally bent and/or, as well as also shown in FIG. 2, at least sectionally straight. Moreover, the pipe or tube, or the deformation body formed therewith, can also be adapted to be inserted into the course of the aforementioned pipe or tube, for example, be connected by means of flange connection to segments of the pipe or tube guiding the measured substance. The radio sensor 112 can, in this case, be connected with the wall of the tube forming the deformation body, or be positioned on a side of the wall facing away from the lumen.

Figure 3A:
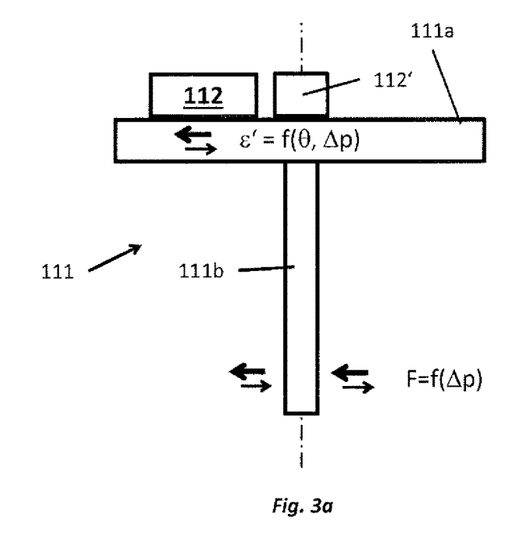
FIGS. 3*a, b, c* a deformation body suitable for forming a measuring system, or a transducer apparatus, of FIG. 1, 2, or 4.
Figure 3B:
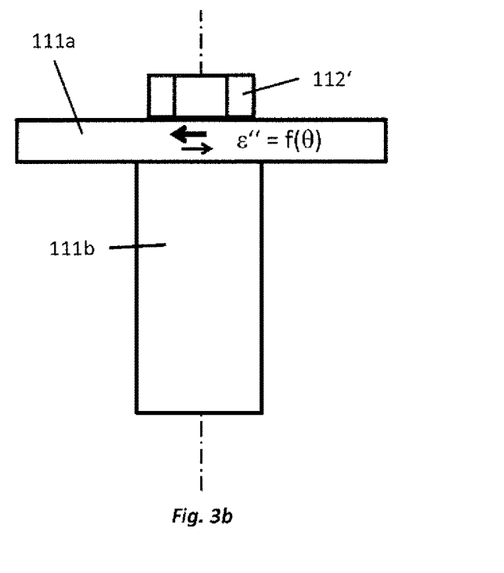
Figure 3C:
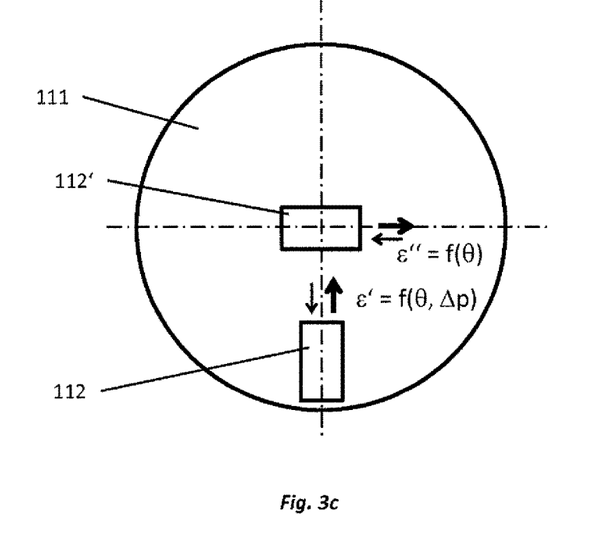

For the aforementioned case, in which the deformation body is formed by means of a membrane 111a, or in which the measuring system formed by means of the transducer apparatus Tr is a vortex flow measuring device, the deformation body 111 includes, according to an additional embodiment of the invention, furthermore, a sensor blade 111b, for example, a paddle-shaped and/or at least sectionally wedge shaped and/or at least sectionally rod-shaped, sensor blade 111b, or the deformation body 111 is formed by means of such a sensor blade 111b. The sensor blade is, as shown in FIG. 3a, 3b, or 3c, or directly evident from a combination of FIG. 1, 3a, 3b, or 3c, positioned on a side of the membrane facing away from the radio sensor 112 and additionally adapted to convert a force F acting thereon, for example, an alternating force resulting from pressure fluctuations p(t) in a Kármán vortex street, into a deformation ε of the membrane effecting the shape change of the surface of the radio sensor 112. Accordingly, the sensor blade 111b is according to an additional embodiment adapted to be inserted into a lumen of a tube, or to be flowed around by a fluid measured substance flowing in a lumen of a tube. For the other mentioned case, in which the deformation body is formed by means of a tube, or in which the measuring system formed by means of the transducer apparatus is a vibronic density measuring device and/or a vibronic viscosity measuring device, the deformation body is according to an additional embodiment adapted, for effecting the shape changes of the surface of the radio sensor changing as a function of time, to be caused to vibrate (FIG. 2), or it is provided that the transducer apparatus further comprises an actuator 115, for example, one positioned directly on the deformation body 111 and/or connected therewith by material bonding and/or high temperature capable, which actuator is adapted to deform the deformation body elastically, especially in such a manner that the deformation body at least at times executes mechanical oscillations about a static resting position and/or in such a manner that the deformation body at least at times is deflected from a static resting position. The actuator can be formed, for example, by means of a piezoelectric stack drive or, for example, by means of a plunging armature, or solenoid, coil.

In the case of the transducer apparatus Tr of the invention, the radio sensor 112 is, as well as also shown in FIG. 2, or directly evident from a combination of FIGS. 1 and 2, positioned on the deformation body 111 in such a manner that the radio sensor 112 has a free surface facing away from the deformation body. The radio sensor 112 is, furthermore, adapted to receive free-space electromagnetic waves, especially free space waves having a carrier frequency lying in a frequency range between 1 GHz and 10 GHz, and to convert such into acoustic surface waves propagating along the surface facing away from the deformation body, or to convert acoustic surface waves propagating along the surface into free-space electromagnetic waves. The radio sensor 112 can, for example, be formed by means of at least one interdigital transducer, especially one electrically connected with at least one antenna, for example, an interdigital transducer with a substrate of langasite ($La_3Ga_5SiO_{14}$) and platinum electrodes arranged thereon, or correspond as regards the basic construction and operation to one of the radio sensors (SAW sensors) disclosed in DE-A 10 2007 021 172, DE-A 4,200,076 or EP-A 1 752 916. Accordingly, the radio sensor 112 includes according to an additional embodiment of the invention at least one antenna, especially an antenna electrically connected, for example, with the aforementioned interdigital transducer, for converting free-space electromagnetic waves received therewith into a line conducted, electrical, alternating voltage and/or for converting an applied, electrical, alternating voltage into free-space electromagnetic waves emitted by the radio sensor 112. The aforementioned antenna can be, for example, a wire antenna, a planar antenna or, for example, a slot antenna.

For the purpose of generating, or processing, free-space electromagnetic waves propagating from within the transducer apparatus Tr, the transducer apparatus comprises according to an additional embodiment of the invention, furthermore, at least one transmitting- and receiving system 113 positioned with a separation, especially a fixed separation, from the radio sensor, and having, for example, an antenna and/or a waveguide. The transmitting- and receiving system 113 is, especially, adapted and applied to transform electrical, alternating voltage into free-space electromagnetic waves propagating toward the radio sensor 112, or to receive free-space electromagnetic waves emitted by the radio sensor 112 and to transform such into a line conducted, electrical, alternating voltage. Furthermore, transducer apparatus Tr comprises a holder system 114 mechanically connected both with the deformation body as well as also with the transmitting- and receiving system 113, and formed, for example, by means of a connecting nozzle, for fixing a position of the transmitting- and receiving system 113 relative to the deformation body 111 located in its static rest position, or relative to the radio sensor 112 connected therewith. The holder system 114 can be embodied, for example, as a connecting nozzle for an electronics-housing accommodating the above-referenced measuring electronics μC, or adapted both to hold the transmitting- and receiving system 113 as well as also the above-referenced electronics-housing.

Figure 4:
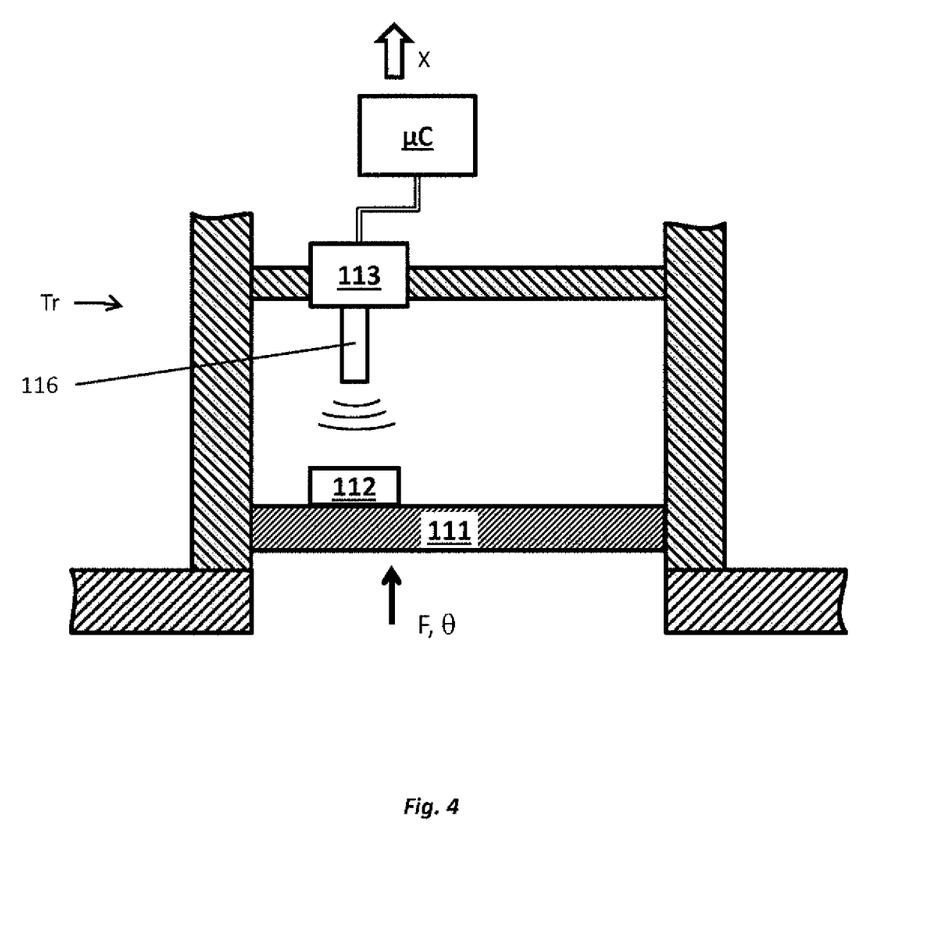
FIG. 4 schematically in section, another variant of a measuring system with a transducer apparatus for measuring a fluid measured substance.

For preventing disturbing influences from possible electromagnetic stray fields in the proximity of the transducer system Tr, or within the same, the transmitting- and receiving system 113 includes, according to an additional embodiment of the invention and as well as also shown schematically in FIG. 4, a waveguide 116 positioned with a separation from the radio sensor 112, for example, a waveguide formed by means of a metal tube and/or formed as a hollow conductor. The waveguide is adapted to guide electromagnetic traveling waves and to transform them at an end facing the radio sensor 112 into free-space electromagnetic waves propagating in the direction of the radio sensor 112, and is also adapted to receive, via the end, free-space electromagnetic waves emitted by the radio sensor 112 and to transform them into electromagnetic traveling waves propagating in the waveguide. The waveguide 116 can in advantageous manner be so positioned that its—proximal— end facing toward the radio sensor 112 is very near to the radio sensor 112, for example, its antenna, or has only a small separation therefrom of a few millimeters, for example, less than 20 mm, especially less than 10 mm. Additionally, the waveguide 116 can in advantageous manner be so embodied that, on the other hand, a—distal—end facing away from the radio sensor 112 is positioned quite far from the radio sensor 112, for example, with a separation of greater than 30 mm, especially greater than 50 mm. Consequently, the waveguide can have a length, measured as shortest separation between proximal and distal ends, which is correspondingly greater than 30 mm, especially greater than 50 mm. In this way, it is enabled in very simple, equally as well effective, manner, to arrange electronic components, or assemblies, of the transmitting- and receiving system 113 with comparatively great separation, in any event, however, separation sufficient for maintaining the operational fitness of the transmitting- and receiving system 113, despite the, in given cases, extremely hot deformation body, or radio sensor, without having to increase the separation established for the actual sending of the free-space electromagnetic waves between radio sensor and transmitting- and receiving system to the detriment of an insensitivity to disturbances of the transducer system to electromagnetic stray fields.

Figure 5:
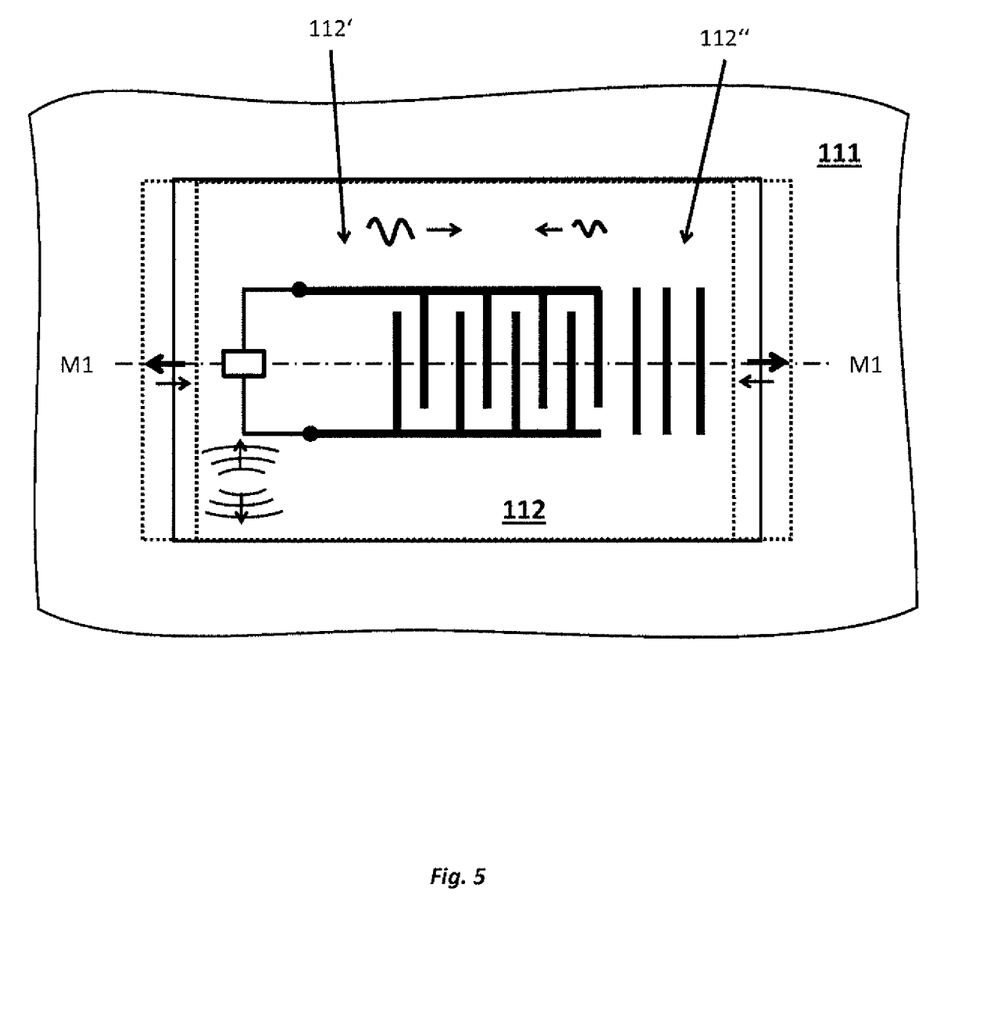
FIG. 5 schematically, a radio sensor suitable for forming a measuring system, or a transducer apparatus, of FIG. 1, 2, or 4.

In an additional embodiment of the invention, the radio sensor 112 is, as well as also shown schematically in FIG. 5, especially, adapted to convert received free-space electromagnetic waves into time delayed free-space electromagnetic waves, for example, delayed by at least 1 μs (microsecond), and/or the radio sensor 112 is adapted to reflect acoustic surface waves propagating along the surface, for example, in such a manner that acoustic surface waves emitted from a transmitting- and receiving zone 112' are converted by means of a reflector zone 112" remote therefrom into acoustic surface waves striking the transmitting- and receiving zone 112' with time delay of, for example, at least 1 μs (microsecond). In an additional embodiment of the invention, the measuring electronics is accordingly, furthermore, adapted to generate the driver signal e1 with a clocked voltage and to couple such into the transducer apparatus Tr. The driver signal can, accordingly, for example, have a voltage, which is embodied as a sequence of rectangular or sinusoidal voltage pulses formed with a predetermined timing, or a predetermined shot rate, to pulse packets. The timing can, for example, also be adjustable, consequently variable, during operation. Furthermore, the measuring electronics can also be adapted to generate the aforementioned pulse packets with an, at least temporarily, constant timing, for instance with a shot rate of greater than 8 kHz, for example, also greater than 20 kHz.

The deformation body 111 is, furthermore, adapted, as a function of a mechanical force acting thereon, especially a mechanical force changeable as a function of time, and/or as a function of a temperature change, or a temperature distribution changeable as a function of time within the transducer apparatus, to be at least partially deformed, for example, strained and/or bent from a static resting position, or a zero position. The transducer apparatus Tr of the invention is, moreover, especially, so embodied that, as well as also schematically shown in FIG. 2, or directly evident from a combination of FIGS. 1 and 5 or FIGS. 2 and 5, due to the above-referenced deforming of the deformation body 111, at least the surface of the radio sensor 112 facing away from the deformation body 111 experiences a shape change—likewise a shape change depending on the force introduced into the deformation body 111, or dependent on the temperature change of the deformation body 111—influencing a propagation, for example, a propagation path, or a travel time, of acoustic surface waves propagating along the surface. In an additional embodiment of the invention, the deformation body 111 and the radio sensor 112 are, furthermore, so embodied that the aforementioned deformations, or shape changes, especially deformations, or shape changes, changing as a function of time, are reversible, at least in the case of predetermined forces and/or temperature changes or forces and/or temperature changes specified for the transducer apparatus. The radio sensor 112 has additionally at least one principal measuring direction M1, namely an imaginary sensor axis, which corresponds to an orientation of a shape change maximum-sensitively influencing the acoustic surface waves propagating along the surface.

In an additional embodiment of the invention, the deformation body 111 is, especially, adapted to react to a mechanical force acting thereon and changeable as a function of time—especially a force having at least at times a periodically changing magnitude and/or at least at times a periodically changing direction—, for example, a force exerted by a fluid measured substance contacting the deformation body, i.e. to react with elastic deformations changing as a function of time, especially elastic deformations, which bring about shape changes of the surface of the radio sensor changing as a function of time and/or with mechanical oscillations about a static resting position, especially with mechanical oscillations about a static resting position, which bring about shape changes of the surface of the radio sensor changing as a function of time For the purpose of generating the at least one measured value X (or the measured values, as the case may be), the measuring electronics is, according to an additional embodiment of the invention, adapted to evaluate the measurement signal e1, in that the measuring electronics ascertains, based on the measurement signal e1, a measured value $X_x$ quantifying a size of an instantaneous shape change of the radio sensor and/or a measured value quantifying a frequency of a periodic shape change of the radio sensor. In an additional embodiment of the invention, the measuring electronics is, especially, also adapted, based on travel time information contained in the measurement signal e1, to ascertain a measured value quantifying a frequency of a periodic shape change of the radio sensor and/or, based on an amplitude spectrum contained in the measurement signal e1, to ascertain a measured value quantifying a size of an instantaneous shape change of the radio sensor. For ascertaining the measured value quantifying the frequency of a periodic shape change of the radio sensor, for example, established travel time measuring methods can be applied, or accomplished, by means of the measuring electronics. The above-referenced amplitude spectrum contained in the measurement signal e1 can, in turn, be calculated, for example, by means of a discrete Fourier transformation done in the measuring electronics and thereafter correspondingly analyzed, for example, evaluated as regards the position, shape and/or height of a maximum peak value.

The force F, or temperature change θ, effecting the above-referenced shape change of the radio sensor 112, or of the deformation body 111 and radio sensor 112, can, such as already mentioned, or also shown in each of FIGS. 1 and 2, be introduced via a side of the deformation body facing away from the radio sensor, or facing the measured substance (or a lumen of the tube serving for guiding the measured substance). Accordingly, the deformation body 111 is, according to an additional embodiment of the invention, furthermore, adapted to be contacted on a side facing away from the radio sensor by a fluid measured substance, for example, a fluid measured substance flowing at least at times, especially in such a manner that the shape change of the surface of the radio sensor 112 is at least partially effected by a force exerted by the fluid measured substance on the deformation body and/or by heat transferred between measured substance and deformation body. Particularly for the purpose of registering temperature changes θ, it can additionally be advantageous, or required, for example, for the purpose of registering also temperature changes negative relative to the static resting position of the deformation body 111, that the deformation body 111 be also mechanically prestressed, for example, elastically strained, in the static resting position.

Figure 6:
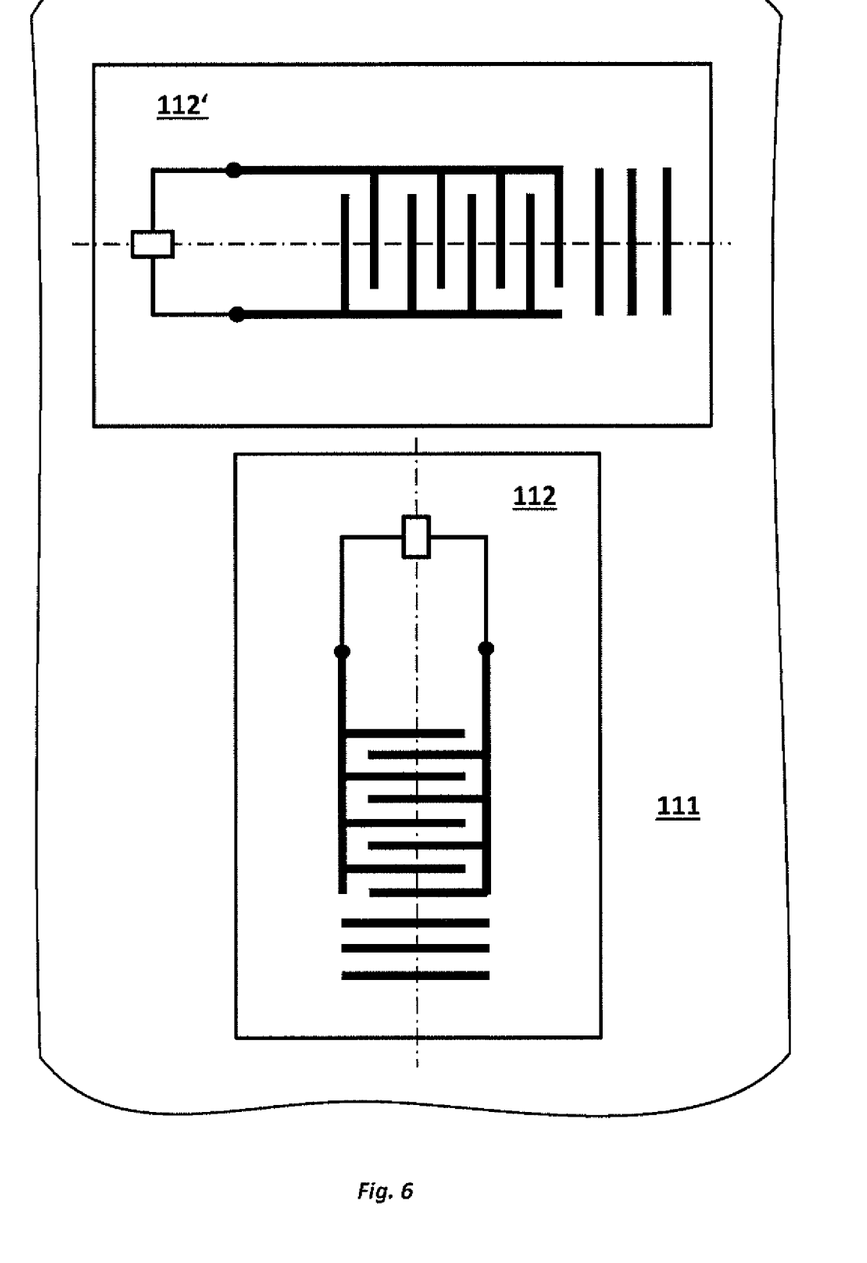
FIG. 6 schematically, an arrangement of two radio sensors suitable for forming a measuring system, or a transducer apparatus, of FIG. 1, 2, or 4.

Particularly for the aforementioned case, in which both a force F acting on the deformation body 111 as well as also a temperature change of the deformation body 111 should be registered by means of the transducer apparatus, or the measuring system formed therewith, the transducer apparatus comprises, according to an additional embodiment, at least one additional—second—radio sensor 112'. For the purpose of an as simple as possible separating of the acoustic surface waves generated by means of the—first—radio sensor 112 and by means of the radio sensor 112' or the corresponding fractions in the free-space electromagnetic waves received by the transmitting- and receiving system 113, or the corresponding signal components in the measurement signals el , each of the at least two radio sensors has, according to an additional embodiment of the invention, in each case, a predetermined bandwidth and a predetermined center frequency, which deviates from the center frequency of the other by more than a sum of the bandwidths of the two radio sensors 112, 112'. The two radio sensors can, as well as also shown in FIG. 6, additionally be so arranged on the deformation body that the respective measuring directions M1 of the two radio sensors 112, 112' deviate from one another, for example, orthogonally. Alternatively or supplementally, the two radio sensors can also be so arranged that each of the radio sensors is positioned in a zone of the deformation body, which as regards the size of a local shape change and/or a form of the local shape change and/or which as regards its reaction to the measured variable x to be registered deviates from that of the other zone, for example, also in such a manner that, such as, for example, also directly evident from a combination of FIGS. 3a, 3b and 3c, the radio sensor 112 reacts to a deformation ε' of the deformation body 111 resulting both from a force F as well as also a temperature change θ and that the radio sensor 112' reacts only to a deformation ε" of the deformation body 111 resulting from a temperature change θ.

The invention claimed is:

1. A transducer apparatus, comprising:
a deformation body;
an actuator adapted to deform said deformation body elastically; and
a radio sensor positioned on the deformation body and connected therewith by material bonding, said radio sensor including a surface facing away from said deformation body, wherein:
said radio sensor is adapted to receive free-space electromagnetic waves and to convert them into acoustic surface waves propagating along the surface facing away from the deformation body;
said radio sensor is adapted to convert acoustic surface waves propagating along the surface into free-space electromagnetic waves; and
said deformation body is adapted as a function of a mechanical force acting thereon and/or as a function of a temperature change, to be at least partially deformed in such a manner that at least the surface of said radio sensor facing away from said deformation body experiences a shape change influencing a propagation of acoustic surface waves propagating along the surface.

2. The transducer apparatus as claimed in claim 1, wherein:
said radio sensor is adapted to convert received free-space electromagnetic waves into time delayed, free-space, electromagnetic waves; and/or
said radio sensor is adapted to reflect acoustic surface waves propagating along the surface, especially in such a manner that acoustic surface waves emitted from a transmitting- and receiving zone are converted into acoustic surface waves striking time delayed on the transmitting- and receiving zone.

3. The transducer apparatus as claimed in claim 1, wherein:
said deformation body is adapted to react to a mechanical force acting thereon and changeable as a function of time with elastic deformations changing as a function of time; and/or
said deformation body is adapted to react to a mechanical force changeable as a function of time and acting thereon with mechanical oscillations about a static resting position; and/or
said deformation body is adapted to be caused to vibrate for effecting the shape changes of the surface of the radio sensor changing as a function of time.

4. The transducer apparatus as claimed in claim 1, wherein:
said actuator is positioned on said deformation body and/or connected therewith by material bonding; and/or
said actuator is adapted to deform said deformation body in such a manner that the deformation body at least at times executes mechanical oscillations about a static resting position and/or in such a manner that the deformation body at least at times is deflected from a static resting position.

5. The transducer apparatus as claimed in claim 1, wherein:
said deformation body is mechanically prestressed in a static resting position; and/or
said deformation body is adapted to be contacted on a side facing away from the radio sensor by a fluid measured substance, especially a fluid measured substance flowing at least at times.

6. The transducer apparatus as claimed in claim 1, wherein:
said deformation body is composed at least partially of a metal; and/or
said deformation body is composed at least partially of a ceramic; and/or
said deformation body is disc shaped.

7. The transducer apparatus as claimed in claim 1, wherein:
said deformation body is tubular.

8. The transducer apparatus as claimed in claim 1, wherein:
said deformation body includes a tube or is formed by means of a tube.

9. The transducer apparatus as claimed in claim 1, wherein:
said deformation body includes a lumen surrounded by a wall and the lumen is adapted to guide a fluid measured substance.

10. The transducer apparatus as claimed in claim 9, wherein:
said radio sensor is positioned on a side of the wall facing away from the lumen; and/or
said radio sensor is connected with the wall.

11. The transducer apparatus as claimed in claim 1, wherein:
said radio sensor includes at least one interdigital transducer.

12. The transducer apparatus as claimed in claim 1, wherein:
said radio sensor includes at least one antenna for converting therewith received, free-space electromagnetic waves into a line conducted, electrical, alternating voltage and/or for converting an applied, electrical, alternating voltage into free-space electromagnetic waves emitted by said radio sensor.

13. Use of a transducer apparatus as claimed in claim 1, comprising registering at least one physical measured variable of a fluid measured substance by measuring the physical variable with the transducer apparatus, and for producing measured values representing the measured variable.

14. A transducer apparatus, comprising:
a deformation body, said deformation body including a membrane or being formed by means of a membrane and said deformation body including a sensor blade or being formed by means of a sensor blade;
and a radio sensor positioned on the deformation body and connected therewith by material bonding, said radio sensor including a surface facing away from said deformation body;
wherein:
said radio sensor is adapted to receive free-space electromagnetic waves and to convert them into acoustic surface waves propagating along the surface facing away from the deformation body,
said radio sensor is adapted to convert acoustic surface waves propagating along the surface into free-space electromagnetic waves, and
said deformation body is adapted, as a function of a mechanical force acting thereon and/or as a function of a temperature change, to be at least partially deformed in such a manner that at least the surface of said radio sensor facing away from said deformation body experiences a shape change influencing a propagation of acoustic surface waves propagating along the surface.

15. The transducer apparatus as claimed in claim 14, wherein:
said radio sensor is said membrane by adhesive.

16. The transducer apparatus as claimed in claim 14, wherein:
said deformation body includes a paddle-shaped sensor blade and/or an at least sectionally wedge shaped sensor blade and/or an at least sectionally rod-shaped sensor blade, or is formed by means of a paddle shaped sensor blade and/or an at least sectionally wedge shaped sensor blade sensor blade and/or an at least sectionally rod-shaped sensor blade.

17. The transducer apparatus as claimed in claim 16, wherein:
said sensor blade is positioned on a side of said membrane facing away from said radio sensor; and/or
said sensor blade is adapted to convert a force acting thereon into a deformation of said membrane effecting the shape change of the surface of the radio sensor; and/or
said sensor blade is adapted to be inserted into a lumen of a tube, or to be flowed around by a fluid measured substance flowing in a lumen of the tube.

18. The transducer apparatus as claimed in claim 17, wherein:
said sensor blade is adapted to convert a force acting thereon and effected by a fluid measured substance into a deformation of said membrane effecting the shape change of the surface of said radio sensor.

19. Use of a transducer apparatus as claimed in claim 16, comprising registering at least one physical measured variable of a fluid measured substance by measuring the physical variable with the transducer apparatus and for producing measured values representing the measured variable.

20. A transducer apparatus, comprising:
a deformation body; and
a radio sensor positioned on the deformation body and connected therewith by material bonding, said radio sensor including a surface facing away from said deformation body;
wherein:
said radio sensor is adapted to receive free-space electromagnetic waves and to convert them into acoustic surface waves propagating along the surface facing away from the deformation body,
said radio sensor is adapted to convert acoustic surface waves propagating along the surface into free-space electromagnetic waves,
and said deformation body is adapted, as a function of a mechanical force acting thereon and/or as a function of a temperature change, to be at least partially deformed in such a manner that at least the surface of said radio sensor facing away from said deformation body experiences a shape change influencing a propagation of acoustic surface waves propagating along the surface;
the transducer apparatus further comprising:
at least one additional radio sensor, wherein each of the radio sensors includes, in each case, a predetermined bandwidth and a predetermined center frequency;
wherein each of the radio sensors includes, in each case, a predetermined bandwidth and a predetermined center frequency which deviates from the center frequency of the other radio sensor by more than a sum of the bandwidths of the two radio sensors.

21. Use of a transducer apparatus as claimed in claim 20, comprising registering at least one physical measured variable of a fluid measured substance by measuring the physical variable with the transducer apparatus and for producing measured values representing the measured variable.

22. A transducer apparatus, comprising:
a radio sensor positioned on the deformation body and connected therewith by material bonding, said radio sensor including a surface facing away from said deformation body;
at least one transmitting and receiving system positioned with a separation from said radio sensor, said radio sensor being adapted and applied to transform electrical, alternating voltage into free-space electromagnetic waves propagating toward said radio sensor and to receive free-space electromagnetic waves emitted by said radio sensor and to transform them into a line conducted, electrical, alternating voltage; and
a holder system mechanically connected both with said deformation body as well as also with said transmitting and receiving system for fixing a position of said transmitting and receiving system relative to said deformation body, or the therewith connected radio sensor, located in the static resting position;
wherein:
said radio sensor is adapted to receive free-space electromagnetic waves and to convert them into acoustic surface waves propagating along the surface facing away from the deformation body,
said radio sensor is adapted to convert acoustic surface waves propagating along the surface into free-space electromagnetic waves, and
said deformation body is adapted, as a function of a mechanical force acting thereon and/or as a function of a temperature change, to be at least partially deformed in such a manner that at least the surface of said radio sensor facing away from said deformation body experiences a shape change influencing a propagation of acoustic surface waves propagating along the surface.

23. The transducer apparatus as claimed in claim 22, wherein said holder system is formed by means of a connecting nozzle.

24. Use of a transducer apparatus as claimed in claim 23, comprising registering at least one physical measured variable of a fluid measured substance by measuring the physical variable with the transducer apparatus and for producing measured values representing the measured variable.

25. A transducer apparatus, comprising:

a deformation body;

a radio sensor positioned on the deformation body and connected therewith by material bonding, said radio sensor including a surface facing away from said deformation body; and at least one transmitting and receiving system positioned with a separation from said radio sensor, said transmitting and receiving system being adapted and applied to transform electrical, alternating voltage into free-space electromagnetic waves propagating toward said radio sensor and to receive free-space electromagnetic waves emitted by said radio sensor and to transform them into a line conducted, electrical, alternating voltage, said transmitting and receiving system including a waveguide positioned with a separation from said radio sensor;

wherein:

said radio sensor is adapted to receive free-space electromagnetic waves and to convert them into acoustic surface waves propagating along the surface facing away from the deformation body, said radio sensor is adapted to convert acoustic surface waves propagating along the surface into free-space electromagnetic waves, and said deformation body is adapted, as a function of a mechanical force acting thereon and/or as a function of a temperature change, to be at least partially deformed in such a manner that at least the surface of said radio sensor facing away from said deformation body experiences a shape change influencing a propagation of acoustic surface waves propagating along the surface; and wherein said waveguide is adapted to guide electromagnetic traveling waves and at an end facing said radio sensor to transform them into free-space electromagnetic waves propagating in the direction of said radio sensor and to receive, via the end, free-space electromagnetic waves emitted by said radio sensor and to transform them into electromagnetic traveling waves propagating in the waveguide.

26. Use of a transducer apparatus as claimed in claim 25, comprising registering at least one physical measured variable of a fluid measured substance representing the measured variable by measuring the physical variable with the transducer apparatus.

* * * * *